(12) United States Patent
Yamada et al.

(10) Patent No.: US 8,223,512 B2
(45) Date of Patent: Jul. 17, 2012

(54) POWER CONVERTER HAVING AN INDUCTOR INCLUDING A FIRST SET OF WINDINGS AND A SECOND SET OF WINDINGS BOTH WOUND ON A COMMON CORE

(75) Inventors: Michiya Yamada, Hino (JP); Yukihiro Nishikawa, Hino (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 383 days.

(21) Appl. No.: 12/382,194

(22) Filed: Mar. 10, 2009

(65) Prior Publication Data

US 2009/0244943 A1 Oct. 1, 2009

(30) Foreign Application Priority Data

Mar. 31, 2008 (JP) .................................. 2008-091029

(51) Int. Cl.
*H02J 1/02* (2006.01)
*H02M 1/12* (2006.01)
*H02M 1/14* (2006.01)
*H01F 27/02* (2006.01)
*H01F 27/28* (2006.01)
*H01F 27/24* (2006.01)

(52) U.S. Cl. ................ 363/39; 363/41; 363/45; 336/83; 336/183; 336/212

(58) Field of Classification Search .............. 363/16, 363/20, 21.04, 40, 41, 43, 45, 89, 39; 336/182, 336/183, 83, 212
See application file for complete search history.

(56) References Cited

U.S. PATENT DOCUMENTS

| | | | | |
|---|---|---|---|---|
| 4,441,146 | A * | 4/1984 | Vinciarelli | 363/20 |
| 5,291,382 | A * | 3/1994 | Cohen | 370/392 |
| 5,991,170 | A * | 11/1999 | Nagai et al. | 363/20 |
| 6,191,676 | B1 * | 2/2001 | Gabor | 336/160 |
| 6,600,670 | B2 * | 7/2003 | Morita et al. | 363/89 |
| 7,327,178 | B2 * | 2/2008 | Cebry | 327/291 |
| 7,598,839 | B1 * | 10/2009 | Wedley | 336/212 |
| 2003/0043007 | A1 * | 3/2003 | Ishizuka et al. | 336/182 |
| 2004/0100347 | A1 * | 5/2004 | Okamoto | 336/83 |
| 2005/0226015 | A1 * | 10/2005 | Tsuruya | 363/89 |
| 2006/0044844 | A1 | 3/2006 | Utsuno et al. | |
| 2006/0158814 | A1 * | 7/2006 | Wasaki et al. | 361/118 |
| 2007/0008743 | A1 * | 1/2007 | Weinberg | 363/16 |
| 2007/0252659 | A1 * | 11/2007 | Suenaga et al. | 333/32 |

FOREIGN PATENT DOCUMENTS

| | | |
|---|---|---|
| GB | 2319418 | 5/1998 |
| JP | 62-051983 | 3/1987 |
| JP | 04-355906 | 12/1992 |

(Continued)

*Primary Examiner* — Adolf Berhane
*Assistant Examiner* — Gary Nash
(74) *Attorney, Agent, or Firm* — Rabin & Berdo, P.C.

(57) ABSTRACT

A power converter includes a small-sized inductor connected to an AC voltage input line for power factor correction and a filter for suppressing conduction noise. The inductor is connected to a rectifier and comprises first and second windings and that are wound on a common magnetic core and loosely coupled with each other. A leakage inductance component of the inductor functions as an energy storage element in a main conversion operation and an excitation inductance component of the inductor functions as a noise reduction element for suppressing an conduction noise caused by on-off operation of a switching element.

10 Claims, 5 Drawing Sheets

FOREIGN PATENT DOCUMENTS

| | | |
|---|---|---|
| JP | 05-191976 | 7/1993 |
| JP | 07-263262 | 10/1995 |
| JP | 08-103077 | 4/1996 |
| JP | 10-150332 | 6/1998 |
| JP | 2001-268920 | 9/2001 |
| JP | 2003-153542 | 5/2003 |
| JP | 2004-297551 | 10/2004 |
| JP | 2005-278399 | 10/2005 |
| JP | 2006-067751 | 3/2006 |
| JP | 2007-235580 | 9/2007 |

* cited by examiner

POWER CONVERTER HAVING AN INDUCTOR INCLUDING A FIRST SET OF WINDINGS AND A SECOND SET OF WINDINGS BOTH WOUND ON A COMMON CORE

CROSS-REFERENCE TO RELATED APPLICATION

This application is based on, and claims priority to, Japanese Patent Application No. 2008-091029, filed on Mar. 31, 2008, the entire contents of which are incorporated herein by reference.

BACKGROUND OF THE INVENTION

1. Field of the Invention

The present invention relates to a power converter that outputs a DC voltage from an AC voltage by on-off controlling a switching element, the DC voltage being generated with energy stored in a an inductor. In particular, the invention relates to a power converter operated as a step-up or step-down chopper.

2. Description of the Related Art

FIG. 5 shows an example of a conventional power converter using a switching element in which a power factor correction circuit is provided in the output side of a rectifying circuit. In the power converter of FIG. 5, an AC power supply 1 supplies a DC voltage to a load 20 through a switching power supply 10.

The switching power supply 10 comprises a noise filter 2 consisting of capacitors 2a, 2b, 2c and a common mode choke coil 3, a rectifying circuit 4 consisting of diodes 4a, 4b, 4c, 4d, an inductor 5 for correcting a power factor disposed in the side of an output line of the rectifying circuit 4, a switching element 6 on-off controlled by a PWM control circuit 6a, and a smoothing circuit consisting of a diode 7 and a capacitor 8. The noise filter 2 is provided for reducing the conduction noise from the power converter to the AC power supply 1. A MOSFET is used for the switching element 6.

Operation of the power converter 10 is described below.

When the switching element 6 is turned on, the inductor 5 is supplied with an electric current and stores energy. Then, when the switching element 6 is turned off, the stored energy is transferred to the load 20. In this stage, the control circuit 6a controls pulse widths of on-off operation of the switching element 6 to make an input current from the AC power supply to be a sinusoidal waveform for correcting the power factor.

Switching operation of a MOSFET used in a rectifier circuit or a inverter circuit composing a power converter such as a PWM inverter is carried out based on driving signals that are pulse wave modulated (PWM) with a carrier frequency in the range from several kHz to ten and several kHz. It is known that the switching operation generates common mode noises containing components at frequencies higher than several tens of kHz between the main circuit conductor and the ground in the power converter.

In order to reduce the conduction noise generated in this type of power factor correction circuit, Patent Document 1 discloses a circuit construction in which a choke coil is divided into two coils each having an equal half number of windings wound on a single core in the opposite polarity, and inserted and connected to the both ends of an output line of the rectifying circuit. In this circuit construction, the high frequency noises such as ripple current generated at the voltage supplying side line and the negative side line from the power factor correction circuit by on-off operation of the switching element appear in the opposite phases, cancelling normal mode noise generated between the voltage supplying side line and the negative side line of the rectifying circuit and diminishing the noise level.

In this type of power converter, the current in the inductor 5 provided for suppressing the normal mode noise has an AC waveform of a superposition with a low frequency component of a sinusoidal waveform and high frequency components due to on-off operation of the switching element 5. The instantaneous current at the peak in the low frequency component is substantially large. A magnetic flux density in the magnetic core at an average current value needs to be so small that the core does not saturate at the moment of this peak. Accordingly, the core needs to be designed in a large size. Further, in a devise that is to permit an overload in a short duration, the core size is necessarily still larger, entailing a problem of enlarged size of an overall power converter.

In the case of connection to an external power source such as a commercial power line, a common mode choke coil 3 is required in a nose filter 2 as shown in FIG. 5. However, the conventional device as disclosed in Japanese Unexamined Patent Application Publication No. 5-191976, FIG. 1) restrains only normal mode noise and cannot suppress common mode noise. Accordingly, a means for suppressing the common mode noise must be provided in addition to the inductor 5 for power factor correction. This is a large obstacle against minimization of a power converter.

SUMMARY OF THE INVENTION

In view of the above-described problems, it is an object of the present invention to provide a power converter that has minimized sizes of an inductor for power factor correction and a filter for managing conduction noise.

To solve the above problem, a power converter includes a rectifier circuit for rectifying an AC voltage, a smoothing capacitor for smoothing an output from the rectifying circuit, a switching element controlling on-off operation of the AC voltage, an inverter circuit, and an inductor including a first set of windings and a second set of windings both wound on a common core and loosely coupled with each other, a leakage inductance component storing energy in a main conversion operation to be output as the DC voltage, and an excitation inductance component suppressing an conduction noise generated by the on-off operation of the switching element.

According to the invention, the leakage magnetic flux does not saturate the core of the inductor. Consequently, saturation of the core is avoided even when energy is stored in the leakage inductance of the inductor. The magnetic core does not need an enlarged size and can be minimized, achieving a small size of an overall power converter.

The excitation inductance of the inductor is utilized as a common mode choke coil, thereby eliminating or minimizing a common mode choke coil, which has been conventionally provided as an additional component.

DETAILED DESCRIPTION OF THE INVENTION

A preferred embodiment according to the invention will be described in the following with reference to accompanying drawings.

Figure 1:
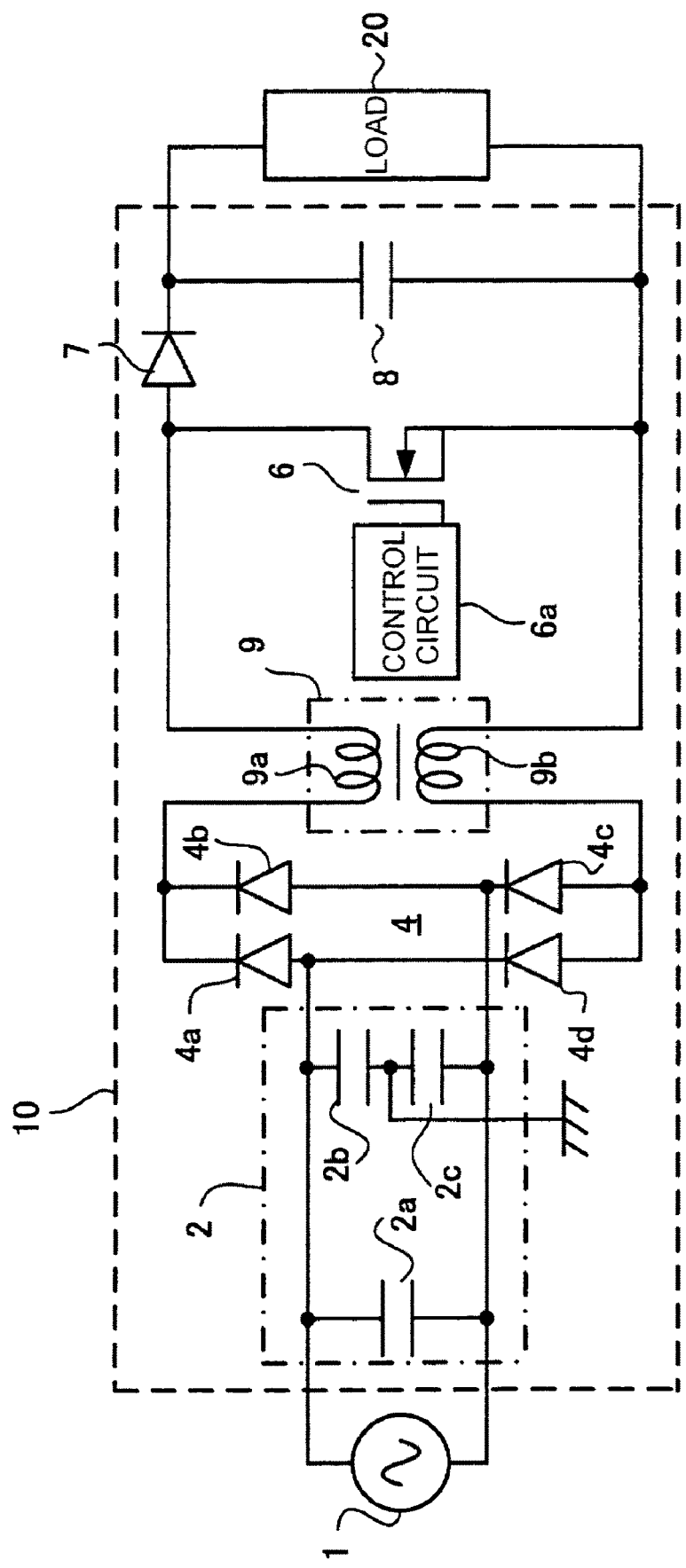
FIG. 1 is a circuit diagram showing an example of a power converter according to an embodiment of the present invention.
Figure 5:
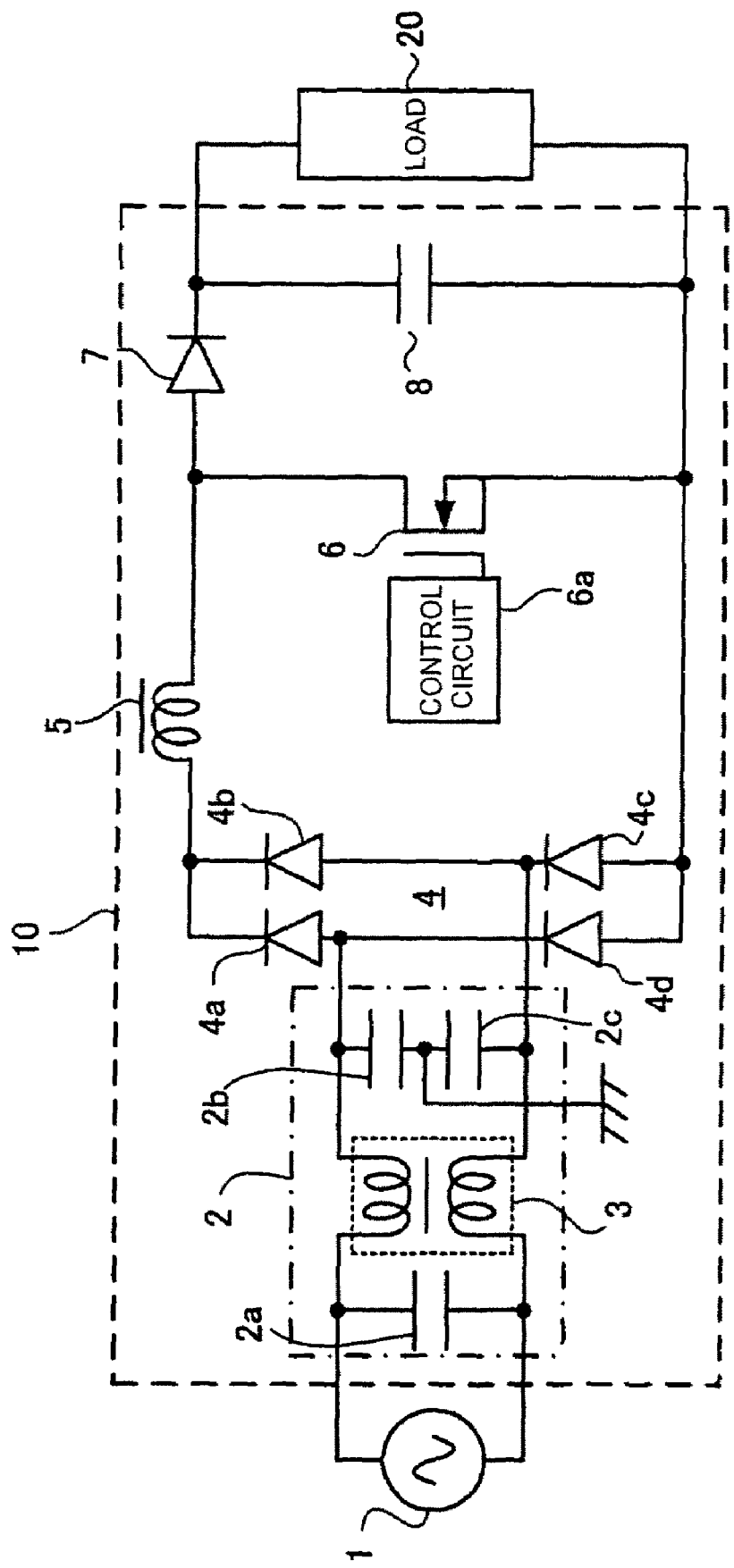
FIG. 5 is a circuit diagram showing an example of a conventional power converter.

FIG. 1 is a circuit diagram showing an example of a power converter according to an embodiment of the present invention. The same parts as those in the conventional power converter of FIG. 5 are given the same symbols and description thereon is omitted.

The power converter shown in FIG. 1 comprises an inductor 9 having first and second sets of windings 9a and 9b wound on a common magnetic core and is disposed between a rectifier circuit 4 and a switching element 6. The inductor functions as a step up coil. The first set of windings 9a is arranged in a voltage supplying side line of the rectifying circuit 4 connecting to a diode 7; the second set of windings 9b is arranged in a negative side line of the rectifying circuit 4 connecting to a ground side of a load 20. The first and second sets of windings 9a and 9b here are wound on a single core with the same number of turns.

When the switching element 6 is turned on, an electric current flows in the set of windings 9a and the set of windings 9b generating a magnetic flux in the core. The magnetic flux generated by the set of windings 9a and the magnetic flux generated by the set of windings 9b are in a opposite direction with each other. In the inductor 9, the major magnetic fluxes cancel with each other and the leakage inductance component stores energy.

Figure 2A:
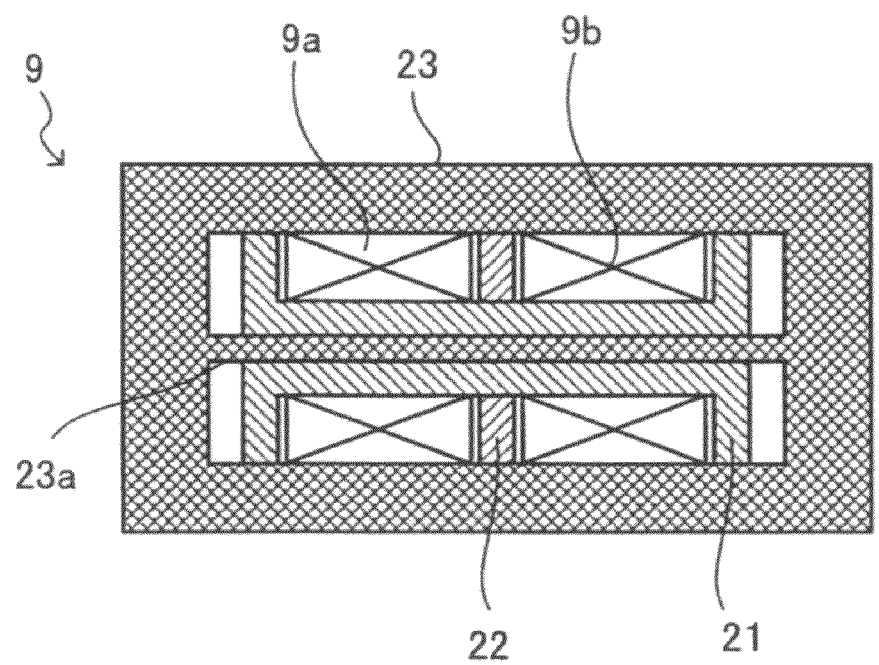
FIG. 2(a) is a sectional view showing a coil configuration of an inductor.
Figure 2B:
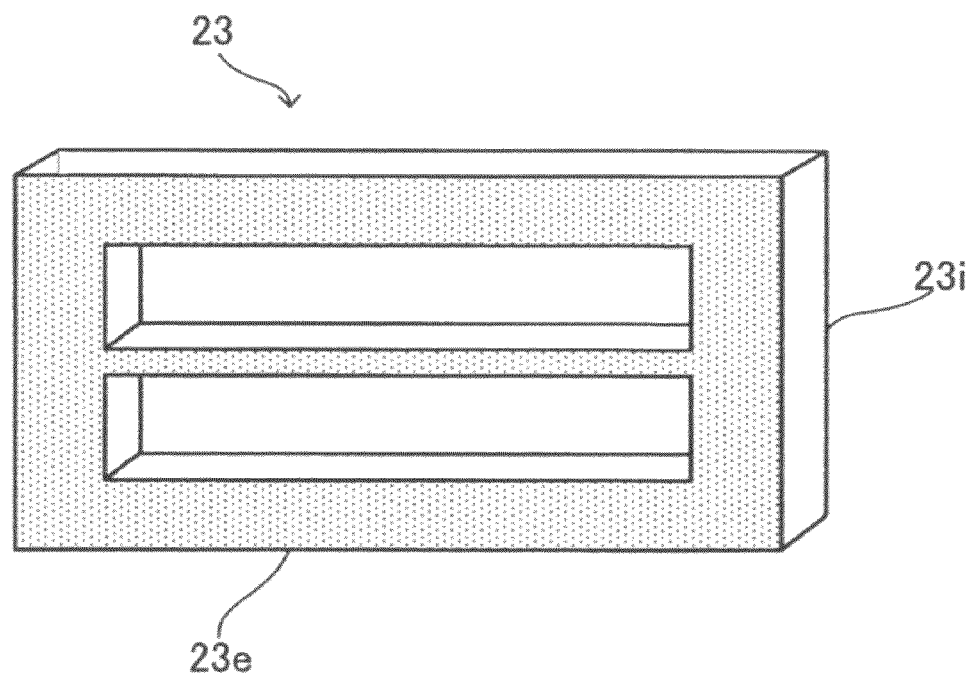
FIG. 2(b) is a perspective view showing a configuration of a magnetic core of the inductor.

FIGS. 2(a) and 2(b) illustrate an inductor as shown in FIG. 1. FIG. 2(a) is a sectional view showing a coil configuration of the inductor, and FIG. 2(b) is a perspective view showing the configuration of the magnetic core.

Referring to FIG. 2(a), a separator made of an insulator 22 is disposed in the middle of the bobbin 21 and separates the first and the second sets of windings 9a, and 9b wound on the bobbin 21 in the left and the right sides. The core 23 has a configuration of the letter 8 as shown in FIG. 2(b), and includes a leg portion 23a of the core penetrating the bobbin 21, and accommodates the first and second sets of windings 9a and 9b in the core 23. The core 23 can be constructed by combining a portion 23e with a shape of the letter E and a portion 23i with a shape of the letter I, or combining two portions each having a shape of the letter E.

The sets of windings 9a and 9b of the inductor 9 correspond to the windings indicated in FIG. 1. A leakage inductance value required for the inductor 9 can be obtained by the sets of windings 9a and 9b that are loosely coupled through the separator 22 at an appropriately loose coupling. The loose coupling means that a magnetic coupling coefficient between the first set of windings 9a and the second set of windings 9b is less than 1 for example, 0.8. The coupling coefficient of less than 1 means existence of a magnetic flux that interlinks with the first set of windings 9a and does not interlink with the second set of windings 9b, and existence of a magnetic flux that interlinks with the second set of windings 9b and does not interlink with the first set of windings 9a. A magnitude of the leakage inductance can be varied by adjusting numbers of turns of the sets of windings 9a and 9b, and by adjusting a distance between the two sets of windings modifying the dimensions of the separator. Thus, the leakage inductance value can be increased to a magnitude in a range of several hundred µH to several mH, which is required to suppress a common mode current.

Figure 3:
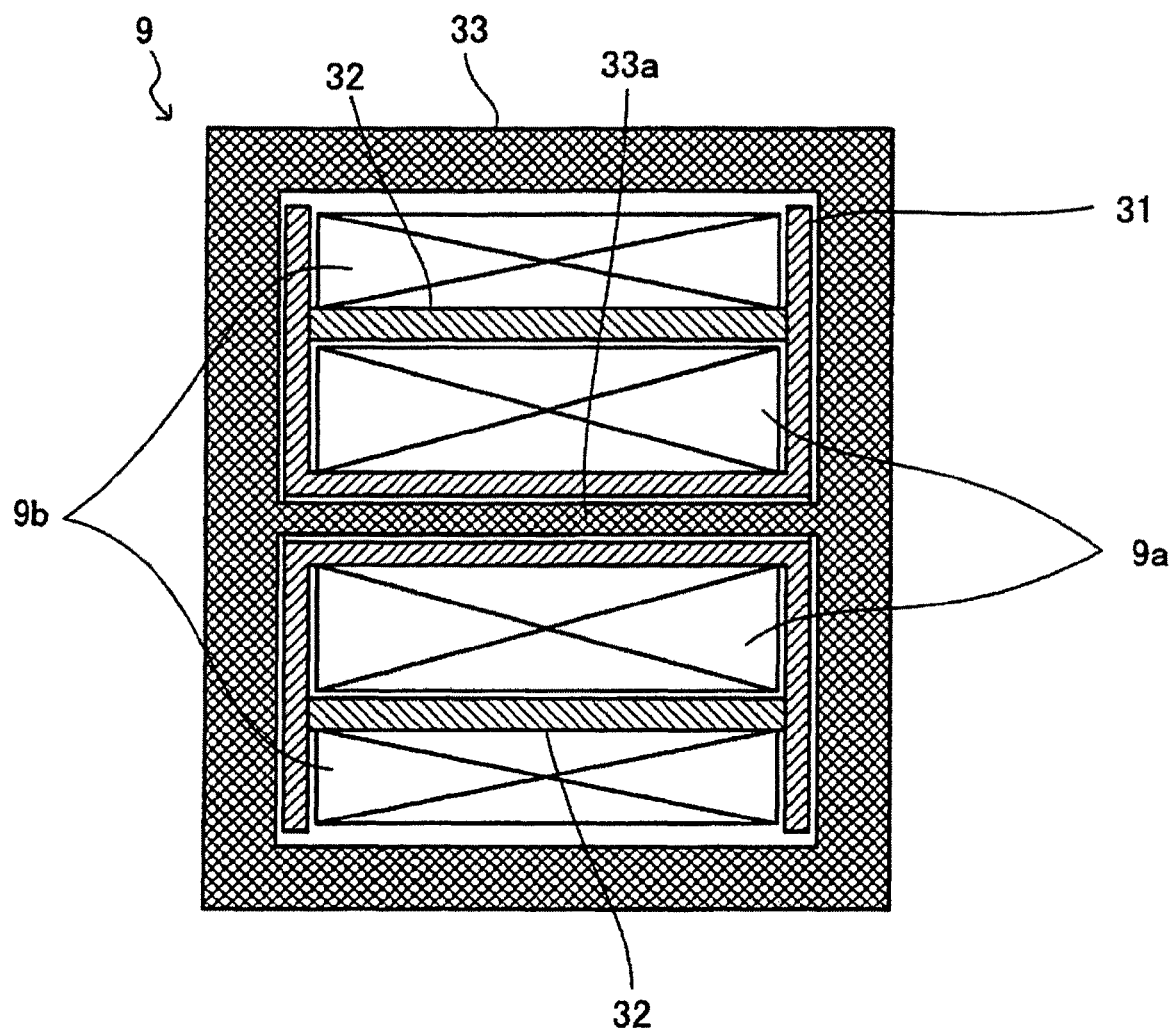
FIG. 3 is a sectional view showing another coil configuration of the inductor in FIG. 1.

FIG. 3 is a sectional view showing another coil configuration composing the inductor indicated in FIG. 1. While the sets of windings 9a and 9b are separated longitudinally (in the direction of the left and the right) in the coil configuration in FIGS. 2(a) and 2(b), the two sets of windings 9a and 9b can be loosely coupled concentrically in a core 33 including a leg portion 33a as shown in FIG. 3 to increase the leakage inductance value.

As shown in FIG. 3, the first set of windings 9a is wound in the inner circumferential side of a common bobbin 31 and the second set of windings 9b is wound in the outer circumferential side of the bobbin coaxially with the first set of windings 9a with a separator 32 made of an insulator interposed therebetween. In this structure, the coupling between the first and second sets of windings 9a and 9b of the inductor 9 can be made loose by increasing a thickness of the separator 32 to attain an enlarged leakage inductance value.

Figure 4:
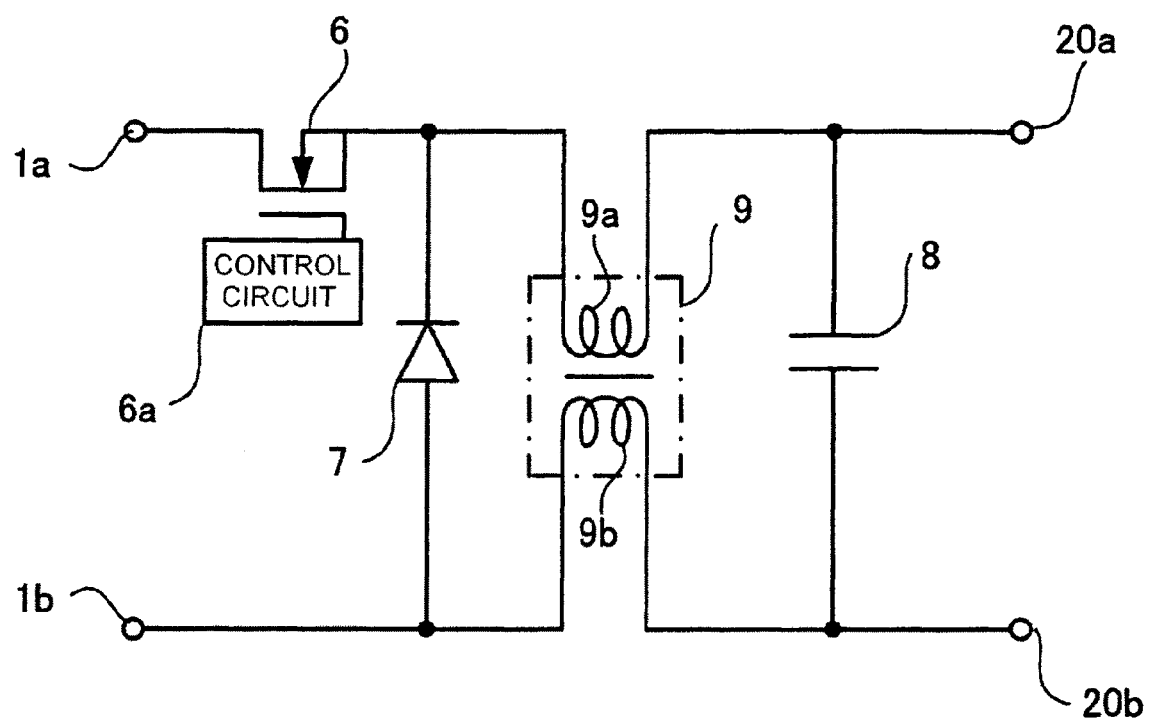
FIG. 4 is a circuit diagram showing second embodiment of a power converter.

FIG. 4 is a circuit diagram showing a second embodiment of a power converter. This embodiment of a converter of the invention is constructed as a step down type chopper. The same parts as those in FIG. 1 are given the same symbols and description is omitted.

Input terminals 1a and 1b are connected to a rectifying circuit 4 (not shown in FIG. 4, but shown in FIG. 1), and output terminals 20a and 20b are connected to a load 20 (not shown in FIG. 4, but shown in FIG. 1). The embodiment of FIG. 4 is different from the embodiment of FIG. 1 in that a switching element 6 is connected to the input terminal 1a that is connected to the rectifying circuit 4, and a first set of windings 9a of an inductor 9 is arranged in the output side of the switching element 6.

The thus constructed power converter utilizes a leakage inductance of the inductor 9 as an energy storage element as in the inverter of FIG. 1, and allows minimization of the coil composing the inductor 9. Therefore, the power converter as a whole can be made small, too.

While the embodiments as described heretofore use a MOSFET for the switching element 6, the switching element 6 can be composed using other switching devices including a bipolar transistor and an IGBT.

Yet in the power converters as shown in FIG. 1 and FIG. 4, an auxiliary coil can be provided corresponding to the common mode choke coil 3 in the conventional converter shown in FIG. 5. Such an auxiliary coil in a converter of the invention has a smaller scale than a common mode choke coil 3 in the conventional technology, and effectively suppresses the common mode noise. Therefore, a size of a power converter can be reduced.

What is claimed is:

1. A power converter outputting a DC voltage from an AC voltage, the power converter comprising:
a rectifier circuit for rectifying an AC voltage;
a smoothing capacitor for smoothing an output from the rectifying circuit;
a switching element controlling on-off operation of the AC voltage; and
an inductor including a first set of windings and a second set of windings both wound on a common core that includes a leg portion formed between a first side and a second side of the core, the first set of windings and the second set of windings being loosely coupled with each other, an insulator interposed between the first set of windings and the second set of windings, a leakage inductance component storing energy in a main conversion operation to be output as the DC voltage, and an excitation inductance component suppressing a conduction noise generated by the on-off operation of the switching element, wherein the first set of windings and the second set of windings are disposed concentrically around a central axis formed within the leg portion, wherein a radius of the first set of windings from the central axis is less than a radius of the second set of windings from the central axis, wherein the insulator is disposed to be concentric with the first set of windings and the second set of windings around the central axis, the insulator having a radius from the central axis that is greater than said radius of the first set of windings, further wherein said radius of the insulator is less than said radius of the second set of windings, and the insulator being disposed between an entire side of the first set of windings and an entire side of the second set of windings.

2. A power converter comprising:

a switching circuit including a switching element and a rectifying element;

a smoothing circuit including an inductor and a smoothing capacitor, the smoothing capacitor smoothing an output from the switching circuit, and the inductor including a first set of windings and a second set of windings wound on a common core that includes a leg portion formed between a first side and a second side of the core, the first set of windings and the second set of windings being loosely coupled with each other, an insulator interposed between the first set of windings and the second set of windings, wherein a leakage inductance component of the inductor stores energy in a main conversion operation, and an excitation inductance component of the inductor suppresses a conduction noise generated by on-off operation of the switching element, wherein the first set of windings and the second set of windings are disposed concentrically around a central axis formed within the leg portion, a radius of the first set of windings from the central axis is less than a radius of the second set of windings from the central axis, and wherein the insulator is disposed to be concentric with the first set of windings and the second set of windings around the central axis, and the insulator having a radius from the central axis that is greater than said radius of the first set of windings, further wherein said radius of the insulator is less than said radius of the second set of windings, and the insulator disposed between an entire side of the first set of windings and an entire side of the second set of windings.

3. The power converter according to claim 1, wherein the inductor is connected between the rectifier circuit and the switching element, and the first set of windings and the second set of windings are arranged in a direction such that a magnetic flux in the first set of windings and a magnetic flux in the second set of windings cancel each other.

4. The power converter according to claim 1, wherein the inductor is connected to an output line side of the switching element, and the first set of windings and the second set of windings are arranged in a direction such that a magnetic flux in the first set of windings and a magnetic flux in the second set of windings cancel each other.

5. The power converter according to claim 1, wherein the first set of windings and the second sets of windings are loosely coupled through a separator.

6. The power converter according to claim 1, further comprising a choke coil for suppressing common mode current.

7. The power converter according to claim 1, wherein a size of the insulator determines a coupling coefficient between the first set of windings and the second set of windings.

8. The power converter according to claim 1, further comprising a bobbin about which the first set of windings and the second set of windings are wound, and wherein the insulator is disposed in a middle portion of the bobbin.

9. The power converter according to claim 8, wherein the leg portion penetrates the bobbin.

10. The power converter according to claim 9, wherein the core further forms a cavity, both the first set of windings and the second set of windings being disposed within the cavity, and the first set of windings and the second set of windings are each further disposed on a first side of the leg portion and a second side of the leg portion opposite the first side of the leg portion, and the bobbin further including a portion touching the leg portion, the bobbin including other portions that are disposed along outer sides of the first set of windings and the second set of windings.

* * * * *